(12) United States Patent
Park et al.

(10) Patent No.: US 10,018,236 B2
(45) Date of Patent: Jul. 10, 2018

(54) ATTACHABLE HIGH-MN STEEL BRAKE DISK

(71) Applicants: POSCO, Pohang-si, Gyeongsangbuk-do (KR); RESEARCH INSTITUTE OF INDUSTRIAL SCIENCE & TECHNOLOGY, Pohang-si, Gyeongsangbuk-do (KR)

(72) Inventors: Kwang Soo Park, Pohang-si (KR); Heung Ju Kim, Pohang-si (KR); Sook Hwan Kim, Pohang-si (KR)

(73) Assignees: POSCO, Pohang-Si, Gyeongsangbuk-Do (KR); RESEARCH INSTITUTE OF INDUSTRIAL SCIENCE & TECHNOLOGY, Pohang-Si, Gyeongsangbuk-Do (KR)

( * ) Notice: Subject to any disclaimer, the term of this patent is extended or adjusted under 35 U.S.C. 154(b) by 0 days.

(21) Appl. No.: 15/369,453

(22) Filed: Dec. 5, 2016

(65) Prior Publication Data

US 2017/0167552 A1   Jun. 15, 2017

(30) Foreign Application Priority Data

Dec. 11, 2015   (KR) ........................ 10-2015-0177405

(51) Int. Cl.
*F16D 65/12* (2006.01)
*C22C 38/20* (2006.01)
*C22C 38/38* (2006.01)

(52) U.S. Cl.
CPC ............ *F16D 65/125* (2013.01); *C22C 38/20* (2013.01); *C22C 38/38* (2013.01); *F16D 65/128* (2013.01); *F16D 2200/0021* (2013.01)

(58) Field of Classification Search
CPC ................ F16D 65/125; F16D 65/128; F16D 2200/0021; F16D 65/12; C22C 38/04
(Continued)

(56) References Cited

U.S. PATENT DOCUMENTS 6,241,055 B1 * 6/2001 Daudi ................ F16D 65/0006
                                                    188/218 XL
6,613,166 B2 * 9/2003 Grimm .................. C22C 38/22
                                                    148/608
(Continued)

FOREIGN PATENT DOCUMENTS

CN   104315043 A    1/2015
JP   H06-264945 A   9/1994
(Continued)

OTHER PUBLICATIONS

Korean Office Action dated Feb. 14, 2017 issued in Korean Patent Application No. 10-2015-0177405 (with English translation).
(Continued)

*Primary Examiner* — Thomas W Irvin
(74) *Attorney, Agent, or Firm* — McDermott Will & Emery LLP

(57) ABSTRACT

An attachable high-manganese steel brake disk includes a first disk member including air vents disposed radially therein to be spaced apart from each other, and a pair of second disk members installed to be attached to two surfaces of the first disk member and having a braking surface in contact with a brake pad. Between the first disk member and the second disk members, at least the second disk members are provided as high manganese steel members.

10 Claims, 15 Drawing Sheets

(58) Field of Classification Search
USPC .................. 188/218 XL, 264 A, 264 AA
See application file for complete search history.

(56) References Cited

U.S. PATENT DOCUMENTS

| | | | | |
|---|---|---|---|---|
| 8,357,247 | B2* | 1/2013 | Hirasawa | C22C 38/001 |
| | | | | 148/310 |
| 9,506,515 | B2* | 11/2016 | White | F16D 65/128 |
| 9,714,686 | B2* | 7/2017 | Moore | C04B 38/06 |
| 2006/0113008 | A1* | 6/2006 | Hirasawa | C22C 38/001 |
| | | | | 148/325 |
| 2012/0058363 | A1* | 3/2012 | Verpoort | C23C 4/08 |
| | | | | 428/649 |
| 2012/0255820 | A1* | 10/2012 | McCord | F16D 65/12 |
| | | | | 188/218 XL |
| 2015/0021128 | A1* | 1/2015 | White | F16D 65/128 |
| | | | | 188/218 XL |
| 2016/0348744 | A1* | 12/2016 | Broda | C03C 8/02 |

FOREIGN PATENT DOCUMENTS

| | | |
|---|---|---|
| JP | 2002-005207 A | 1/2002 |
| JP | 2011-230182 A | 11/2011 |
| JP | 2013-053742 A | 3/2013 |
| KR | 10-2001-0082476 A | 8/2001 |
| KR | 10-2008-0024723 A | 3/2008 |
| KR | 10-2010-0098816 A | 9/2010 |
| KR | 10-2012-0026249 A | 3/2012 |
| KR | 10-2014-0052616 A | 5/2014 |
| KR | 10-2016-0078805 A | 7/2016 |
| WO | 02/31376 A1 | 4/2002 |
| WO | 2012/033377 A2 | 3/2012 |

OTHER PUBLICATIONS

Office Action issued in corresponding Korean Application No. 10-2015-0177405, dated Aug. 30, 2017 (with full English translation).

Chinese Office Action dated May 21, 2018 issued in Chinese Patent Application No. 201611131408.8.

* cited by examiner

ATTACHABLE HIGH-MN STEEL BRAKE DISK

CROSS-REFERENCE TO RELATED APPLICATION(S)

This application claims benefit of priority to Korean Patent Application No. 10-2015-0177405 filed on Dec. 11, 2015 in the Korean Intellectual Property Office, the disclosure of which is incorporated herein by reference in its entirety.

BACKGROUND

1. Field

The present disclosure relates to a high-manganese steel brake disk, and more particularly, to a high-manganese steel brake disk having improved braking performance, wear resistance and heat dissipation characteristics through the use of high manganese steel in the manufacturing of a brake disk.

2. Description of Related Art

In general, braking devices mounted in vehicles are devices for reducing the speed of moving vehicles or bringing moving vehicles to a completely stopped state. Generally, compressed oil, pressurized according to the pressure of brake pedals, or high-pressure compressed air stored in air tanks, is forcedly supplied to brake mechanisms installed on the sides of vehicle wheels, from master cylinders, such that brake drums or brake disks may respectively be braked.

Brake disks may generate a braking effect by being contacted by brake pads. In the case of related art braking devices, brake disks contacted by brake pads to generate braking power are generally manufactured using ordinary carbon steel.

However, general carbon steel used for related art brake disks has negative properties, such as being relatively heavy due to the specific gravity thereof, a major cause of reduced fuel efficiency in the case in which carbon steel brake disks are applied to automobiles or the like.

In the case of the related art brake disks formed of general carbon steel, a problem in which corrosion may occur due to environmental conditions such as humidity, high or low temperatures, and the like, on the braking surfaces of brake disks.

Thus, the development of a brake disk formed of a material other than carbon steel, able to maintain excellent braking performance, heat dissipation performance, and corrosion resistance and reduce a weight of the brake disk, is required.

In the related art, since a brake disk rotor is integrally manufactured and used, in the case in which a surface of the brake disk, actually controlling braking performance of a brake, is worn, a problem in which the entirety of the brake disk rotor should be replaced may be present.

Furthermore, since the entirety of the brake disk rotor is manufactured of a single metal, toughness and impact resistance of the entirety of the brake disk rotor, as well as wear resistance and braking performance determining the performance of the brake, should be considered together. Thus, a problem in which braking performance and wear resistance are naturally degraded together has occurred.

SUMMARY

An aspect of the present disclosure is to provide a brake disk, provided to address at least one requirement or problem occurring in brake disks according to the related art.

An aspect of the present disclosure is to provide an attachable high-manganese steel brake disk having improved toughness and impact resistance as well as improved braking performance and wear resistance of a braking surface of a brake disk, by using different materials to form a braking surface of a brake disk and a structural portion of the brake disk.

An aspect of the present disclosure is to provide an attachable high manganese steel brake disk in which, by adopting a fastening method of a bolt member and a concave-convex type fastening method for supporting the torque in a direction of rotation in an overlapping fastening manner, members configuring a brake disk, rotating at high speed, may be stably coupled to each other.

According to an aspect of the present disclosure, an attachable high-manganese steel brake disk includes a first disk member including air vents disposed radially therein to be spaced apart from each other, and a pair of second disk members installed to be attached to two surfaces of the first disk member and having a braking surface in contact with a brake pad. Between the first disk member and the second disk members, at least the second disk members are provided as high manganese steel members.

The first disk member may be provided as a member formed of a carbonated steel material, and the second disk members may be provided as members formed of a high manganese steel material.

The first disk member may include a first disk body, air vents spaced apart from each other radially within the first disk body, first protrusions respectively protruding from two surfaces of the first disk body and spaced apart from each other on the first disk body radially, and first insertion portions disposed between the first protrusions, and the second disk members may include a second disk body having a braking surface contacting a brake pad, second protrusions protruding from a surface of the second disk body and spaced apart from each other radially on the second disk body, and second insertion portions disposed between the second protrusions.

The first disk member and the second disk members may be fixed by a fastening member, in a state in which the first protrusions are inserted into the second insertion portions and the second protrusions are inserted into the first insertion portions.

The fastening member may be disposed in positions in which the first insertion portions and the second protrusions are coupled to each other, and may be provided as bolt members fastened in a state in which lower surfaces of the first insertion portions and the second protrusions contact each other.

A circumferential width of each of the second protrusions may be greater than a circumferential width of each of the first protrusions.

A circumferential width of each of the first protrusions may be greater than a circumferential width of each of the second protrusions.

The first protrusions may be disposed to correspond to positions of portions of the air vents.

The air vents may be disposed radially inside the first disk body, and may have a bar-shaped space having a quadrangular cross section or a bar-shaped space having a predetermined curvature while having a quadrangular cross section.

The first disk member and the second disk members may be provided as members formed of high manganese steel composed of 1.09 weight % to 1.31 weight % of carbon (C), and 16 weight % to 20 weight % of manganese (Mn), as well as iron (Fe) and inevitable impurities as a remainder thereof.

The first disk member and the second disk members may be provided as members formed of high manganese steel including a basic composition containing 1.09 weight % to 1.31 weight % of carbon (C), and 16 weight % to 20 weight % of manganese (Mn), as well as iron (Fe) and inevitable impurities as a remainder thereof and including one or more selected from the group consisting of 2.2 weight % to 2.8 weight % of chromium (Cr) and 0.3 weight % to 0.7 weight % of copper (Cu).

The first disk member and the second disk members may be provided as members formed of high manganese steel composed of 1.09 weight % to 1.31 weight % of carbon (C), 16 weight % to 20 weight % of manganese (Mn), 2.2 weight % to 2.8 weight % of chromium (Cr), and 0.3 weight % to 0.7 weight % of copper (Cu), as well as iron (Fe) and inevitable impurities as a remainder thereof.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
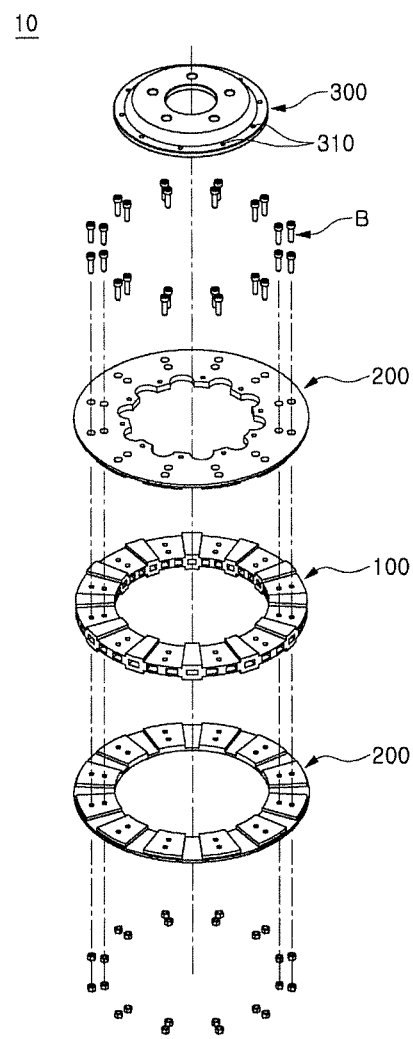
FIG. 1 is an exploded perspective view of an attachable high manganese steel brake disk according to an exemplary embodiment in the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The contents of the present disclosure described below may have a variety of configurations and propose only a required configuration herein, but are not limited thereto.

Hereinafter, an attachable high manganese steel brake disk 10 according to an exemplary embodiment will be described in detail with reference to the accompanying drawings.

With reference to FIG. 1, the attachable high manganese steel brake disk 10 according to an exemplary embodiment may include a first disk member 100 and second disk members 200, and may further include an axial coupling portion 300.

As illustrated in FIG. 1, the attachable high manganese steel brake disk 10 may include the first disk member 100 having air vents 115 radially formed therein to be spaced apart from each other, and a pair of second disk members 200 attached to two surfaces of the first disk member 100 and provided with a braking surface contacting a brake pad. Between the first disk member 100 and the second disk members 200, at least the second disk members 200 may be provided as high manganese steel members.

Figure 2:
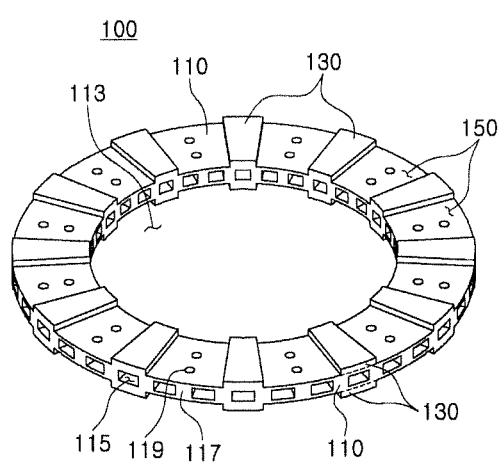
FIG. 2 is a perspective view illustrating a first disk member of the attachable high manganese steel brake disk illustrated in FIG. 1.

As illustrated in FIG. 2, the first disk member 100 may include the air vents 115 radially formed to be spaced apart from each other therein.

The second disk members 200 may have one surface attached to the first disk member 100 and the other surface contacting the brake pad.

The first disk member 100 may form a structural portion of the attachable high manganese steel brake disk 10 and the second disk members 200 may provide a braking surface of the attachable high manganese steel brake disk 10.

Thus, as a material of the first disk member 100, general carbon steel having excellent toughness and impact resistance and a relatively low cost, used in casting products may be used, while as a material of the second disk members 200, high-manganese steel having excellent braking performance and wear resistance of a braking surface of the brake disk 10 may be used. Toughness and impact resistance may be improved simultaneously with improvement of braking performance and wear resistance of a braking surface of the attachable high manganese steel brake disk.

As illustrated in FIG. 1, the second disk members 200 may be installed to be attached to two surfaces of the first disk member 100.

For example, when the braking surfaces of the second disk members 200 formed of a high-manganese steel material contact the brake pad and are worn, only the second disk members 200 having a braking surface contacting the brake pad may be replaced and used, thereby providing an effect that the replacement and maintenance costs of the attachable high-manganese steel brake disk 10 may be reduced.

Only the second disk members 200 having a braking surface contacting the brake pad may be formed of a high manganese steel material, which may be attached to the first disk member 100. Thus, for example, when the braking surface comes into contact with the brake pad and is worn, the second disk members 200 may be replaced, thereby providing an effect that the replacement and maintenance costs of the attachable high-manganese steel brake disk 10 may be reduced.

In addition, as the second disk members 200 are configured to be attached to two surfaces of the first disk member 100, the second disk members 200, for which a brake disk formed of a high-manganese steel material is difficult to be manufactured using a casting method, may be produced using a forging method, instead of using the casting method. Further, the attachable high manganese steel brake disk 10 may be produced by adopting the forging method and utilizing material characteristics of high manganese steel. Thus, excellent material properties, such as lightness of the brake disk, improved wear resistance and braking performance, and the like may be easily secured.

Although all of the second disk members 200 and the first disk member 100 may be formed of high-manganese steel, considering that high manganese steel is more expensive than ordinary carbon steel, only the second disk members 200 may be formed of a high manganese steel material attachable to the first disk member 100, in terms of cost.

The first disk member 100 may be formed of a carbon steel material and the second disk members 200 may be formed of a high-manganese steel material.

The first disk member 100 may be formed of a carbonated steel material composed of carbon (C), and iron (Fe) and inevitable impurities as a remainder thereof. The second disk members 200 may be formed of a high manganese steel material composed of carbon (C), and manganese (Mn), as well as iron (Fe) and inevitable impurities as a remainder thereof. In this case, the high manganese steel may indicate iron-based alloy steel containing 10% or more of manganese (Mn).

The first disk member 100 may be provided with air vents 115 formed therein to be spaced apart from each other radially, and may be formed of a carbonated steel material.

The respective second disk members 200 may have one surface attached to the first disk member 100 and the other surface contacting a brake pad, and may be formed of a high manganese steel material.

Between the first disk member 100 and the second disk members 200, at least the second disk members 200 having a braking surface contacting a brake pad may be formed of a high manganese steel material having excellent wear resistance, heat dissipation characteristics, and the like.

Although all of the first disk member 100 and the second disk members 200 may be formed of a high-manganese steel material, by considering that castability is degraded in the case of high manganese steel and the first disk member 100 may be formed using a casting method as positive properties, in the case of the first disk member 100 in which the air vents 115 are integrally formed as illustrated in FIG. 2, the first disk member 100 may be formed of a carbonated steel material using the casting method. In addition, the second disk members 200 may be formed of a high manganese steel material.

As illustrated in FIG. 2, the first disk member 100 may include a first disk body 110, air vents 115, first protrusions 130, and first insertion portions 150.

The first disk member 100 may include the first disk body 110, the air vents 115 spaced apart from each other radially within the first disk body 110, the first protrusions 130 protruding from two surfaces of the first disk body 110 and spaced apart from each other on the first disk body 110 radially, and the first insertion portions 150 formed between the first protrusions 130.

Figure 3A:
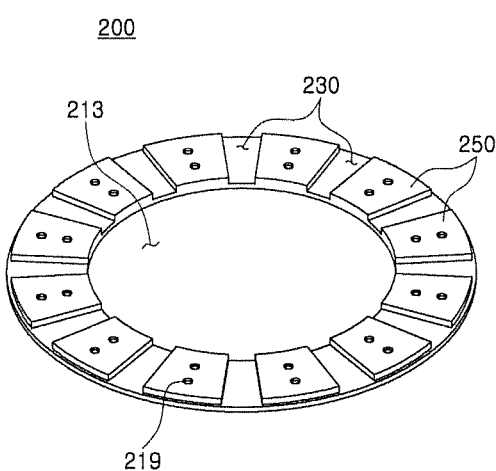
FIGS. 3A and 3B are perspective views illustrating upper and lower second disk members of the brake disk illustrated in FIG. 1.
Figure 3B:
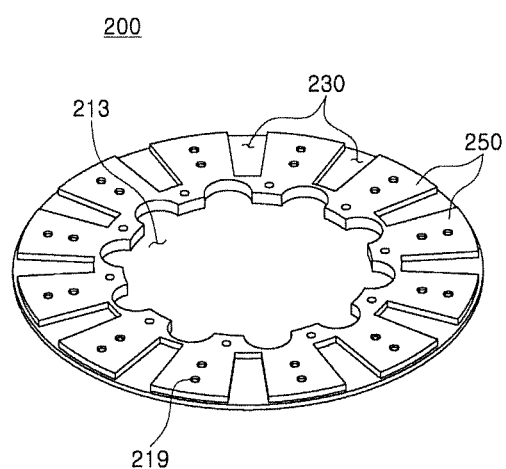

As illustrated in FIGS. 3A and 3B, the second disk member 200 may include a second disk body 210, second protrusions 250, and second insertion portions 230.

As illustrated in FIG. 3A, the second disk member 200 may include the second disk body 110 having a braking surface contacting a brake pad, the second protrusions 250 protruding from one surface of the second disk body 210 and spaced apart from each other on the second disk body 110 radially, and the second insertion portions 230 formed between the second protrusions 250.

The first disk body 110 and the second disk body 210 may be provided as ring-shaped plate members having hollow portions 113 and 213 therein, respectively. The first protrusions 130 may be disposed radially on two surfaces of the ring-shaped plate member, and the second protrusions 250 may be disposed radially on one surface of the ring-shaped plate member.

As illustrated in FIG. 3B, in the case of the second disk member 200 provided adjacently, in a direction in which the axial coupling portion 300 is coupled, coupling holes 211 may be formed in portions of the second disk body 210 thereof extending toward the hollow portion 213.

In the attachable high manganese steel brake disk 10, the axial coupling portion 300 may be provided to be coupled to a disk body and coupled to a rotation axis of a wheel. In the axial coupling portion 300, a plurality of coupling holes 310 for coupling to the disk body may be arranged radially.

In the second disk body 210, the plurality of coupling holes 211 may be formed to correspond to positions of the coupling holes 310 formed in the axial coupling portion 300. Bolts (not shown) may respectively be fastened to the coupling holes 310 formed in the axial coupling portion 300 and the coupling holes 211 formed in the second disk body 210, in such a manner that the second disk body 210 and the axial coupling portion 300 may be fixed to each other.

As illustrated in FIGS. 1 to 4, for example, when the first protrusions 130 are inserted into the second insertion portions 230 and the second protrusions 250 are inserted into the first insertion portions 150, the first disk member 100 and the second disk members 200 may be fixed by fastening members B.

For example, when the fastening members B such as bolt members are inserted into fastening holes, the fastening members B may be fastened to the fastening holes in such a manner that head portions of the bolt members may be further counter-sunk than a contact surface between the second disk body 210 and the brake pad.

The fastening holes may be formed through a separate fastening hole forming process in a state in which the first disk member 100 is manufactured using a casting method and the second disk members 200 are manufactured using a forging method. The fastening holes may be formed to have an inner diameter corresponding to an outer diameter of a body portion of the fastening member (B) on which a screw thread is formed.

Figure 5A:
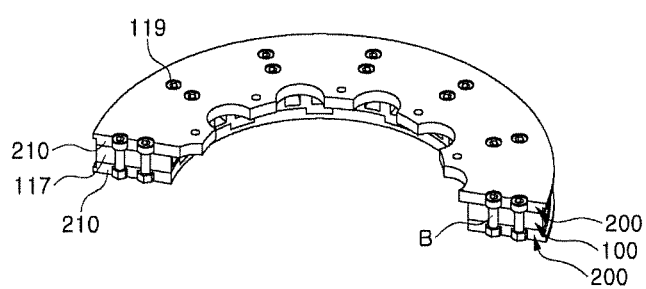
FIG. 5A is a cross-sectional view illustrating a portion of FIG. 4 to which a fastening member is fastened.
Figure 5B:
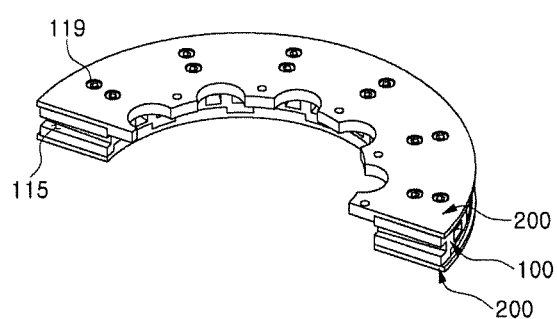
FIG. 5B is a cross-sectional view illustrating a portion of FIG. 4 in which an air vent is formed.

As illustrated in FIG. 5A, the fastening member B may be disposed in a position in which the first insertion portion 150 and the second protrusion 250 are coupled to each other. The fastening member B may be fastened thereto in a state in which bottom surfaces of the first insertion portion 150 and the second protrusion 250 are in contact with each other, and the fastening member B may be provided as a bolt member.

As illustrated in FIG. 2, the first disk member 100 may include a first coupling hole 119 penetrating through at least a portion of a partition wall portion 117 formed between the air vents.

As illustrated in FIGS. 3A and 3B, second fastening holes 219 of the second disk member 200 may be formed in positions corresponding to positions of the first coupling holes 119.

Figure 4:
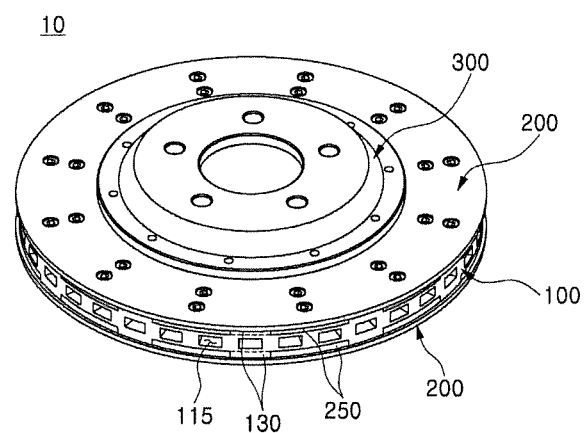
FIG. 4 is a perspective view illustrating a combined state of configurations of FIG. 1.

As illustrated in FIG. 4, the second coupling holes 219 may be formed to penetrate through a contact surface between the second disk members 200 and the brake pad in a counter-sunk manner.

The second fastening holes 219 may be formed in positions corresponding to positions of the first fastening holes 119, and the second fastening holes 219 may be formed in a manner in which surfaces thereof contacting the brake pad are inserted thereinto.

In order to form first fastening holes in which the fastening members B are insertedly installed, in the partition wall portion 117, the first insertion portions 150 into which the second protrusion portions 250 are inserted may be required to be installed in a region including at least one partition wall portion 117.

As illustrated in FIG. 5A, the fastening members B may be provided as bolt members installed by penetrating through the first fastening holes 119 and the second fastening holes 219.

Since the fastening members B may be fastened without penetrating through the air vents 115 as positive properties in terms of heat dissipation characteristics of the brake disk, the fastening members B may be installed by penetrating through the first fastening holes formed in the partition wall portions 117 provided between the air vents 115 adjacent to each other formed in the first disk member 100.

For example, the fastening members B may be fastened by penetrating through the first fastening holes 119 formed in portions of a plurality of partition wall portions 117 provided between adjacent air vents 115 of the first disk member 100 and penetrating through the second fastening holes 219 formed in the second protrusions 250 of the second disk members 200.

As illustrated in FIGS. 1 to 4, the fastening holes formed in the first disk body 110 and the second disk body 210 may be spaced apart from each other by a predetermined interval therebetween, radially with respect to the center of the disk bodies. For example, when the first disk member 100 and the second disk members 200 are superposed to be combined with each other, the first fastening holes 119 formed in the first disk body 110 and the second fastening holes 219 formed in the second disk bodies 210 may be disposed in positions opposing each other.

Figure 8:
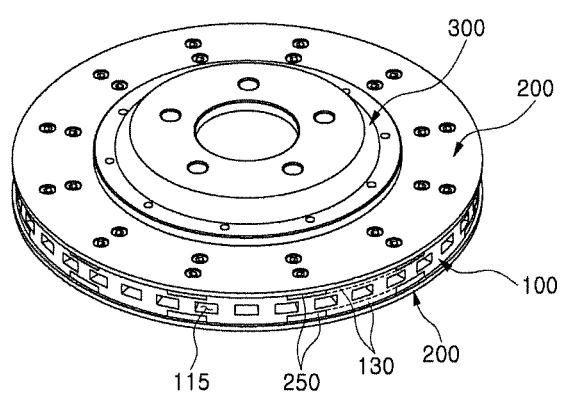
FIG. 8 is a perspective view illustrating a combined state of configurations of FIG. 7.
Figure 10:
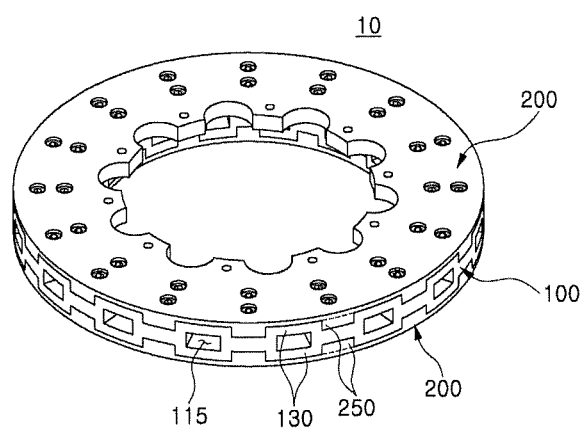
FIG. 10 is a perspective view illustrating a combined state of configurations of FIG. 9.

As illustrated in FIGS. 4, 8 and 10, in a state in which the second protrusions 250 have been inserted into the first insertion portions 150 and the first protrusions 130 have been inserted into the second insertion portions 230, the fastening members B may be fastened in positions in which the first insertion portions 150 and the second protrusions 250 are coupled to each other.

The second protrusions 250 may be inserted into the first insertion portions 150 and the first protrusions 130 may be inserted into the second insertion portions 230, in such a manner that sides of the first protrusions 130 and the second protrusions 250 contact each other.

The second protrusions 250 may be inserted into the first insertion portions 150, and the first protrusions 130 may be inserted into the second insertion portions 230, to support torque of the brake disk in a rotational direction thereof, and the first disk member 100 and the second disk members 200 may be fastened to each other using the fastening members B in an overlapping fastening manner.

By adopting the overlapping fastening manner as described above in fastening the first disk member 100 and the second disk members 200 to each other, torque of the brake disk in a rotational direction thereof, which is difficult to be supported only by fastening of the fastening members B, such as bolt members or the like, may be stably supported. Thus, the first disk member 100 and the second disk members 200 may be stably fastened to each other.

As illustrated in FIGS. 1 to 4, a circumferential width of the second protrusion 250 may be greater than a circumferential width of the first protrusion 130.

As a contact area of the second protrusion 250 contacting a region of formation of the air vents 115 is increased, the second protrusion 250 formed of manganese steel having relatively high thermal conductivity may be disposed in a relatively wide region corresponding to the region of the air vents 115, and thus, heat dissipation characteristics of the brake disk may be improved.

At least two or more air vents 115 may be disposed in the first insertion portion 150 formed between the first protrusions 130 adjacent to each other. In detail, a coefficient of heat transfer between the second protrusions 250 and the air vents 115 may be increased to improve heat dissipation characteristics by sufficiently securing an area of the second protrusion 250 inserted into the first insertion portion 150.

As illustrated in FIG. 4, the first protrusions 130 may be disposed to correspond to regions of one air vents 115, respectively, and the second protrusions 250 may be disposed to correspond to a region of at least two air vents 115.

For example, since the fastening members B may be fastened without penetrating through the air vents 115 as positive properties in terms of heat dissipation characteristics of the brake disk, the fastening members B may be installed by penetrating through the first fastening holes formed in the partition wall portions 117 between the air vents 115 adjacent to each other formed in the first disk member 100.

Thus, in order to form the first fastening holes through which the fastening members B are to penetrate and be installed in the partition wall portions 117, the first insertion portions 150 into which the second protrusions 250 are inserted may be required to be formed in regions including at least one partition wall portion 117.

Figure 7:
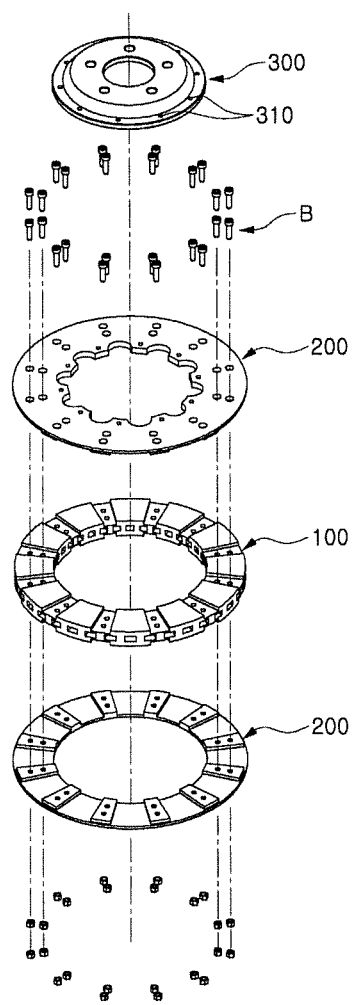
FIG. 7 is an exploded perspective view of an attachable high manganese steel brake disk according to another exemplary embodiment in the present disclosure.

As illustrated in FIGS. 7 and 8, a circumferential width of the first protrusion 130 may be greater than a circumferential width of the second protrusion 250.

For example, an amount of high-manganese steel used may be decreased by reducing a width of the second protrusion 250 formed of an expensive high-manganese steel material, thereby reducing an overall disk manufacturing cost.

In addition, since high manganese steel may be superior in physical rigidity to carbon steel, even when the circumferential width of the second protrusion 250 formed of a high manganese steel material is reduced, the first disk member 100 and the second disk members 200 may not have an influence on fastening force therebetween.

Figure 9:
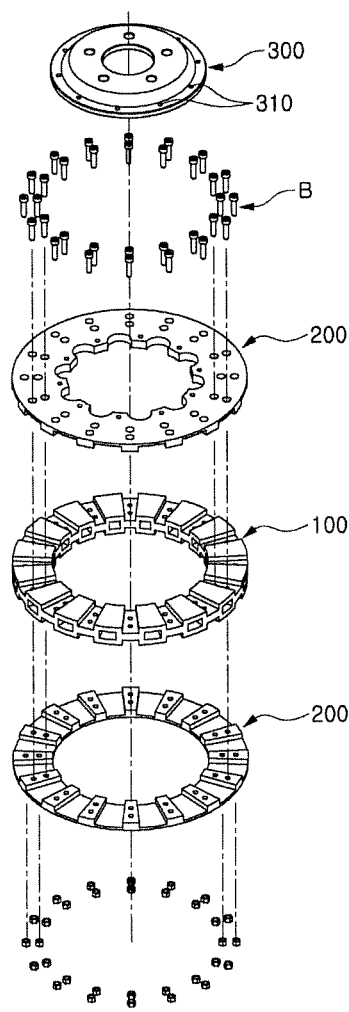
FIG. 9 is an exploded perspective view of an attachable high manganese steel brake disk according to another exemplary embodiment in the present disclosure.

As illustrated in FIGS. 9 and 10, the first protrusions 130 may be disposed to correspond to a position of each air vent 115, and the number of the first protrusions 130 formed in one surface of the first disk member 100 may correspond to the number of the air vents 115.

Figure 6A:
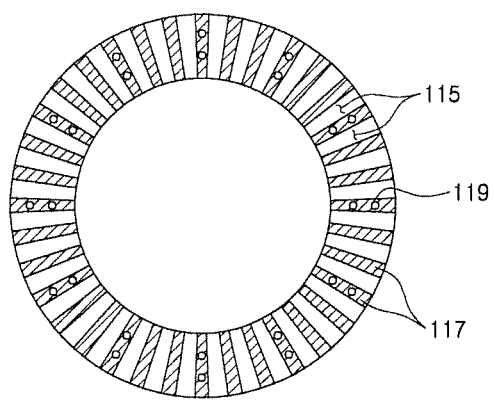
FIGS. 6A and 6B are plan views of air vents having different shapes.
Figure 6B:
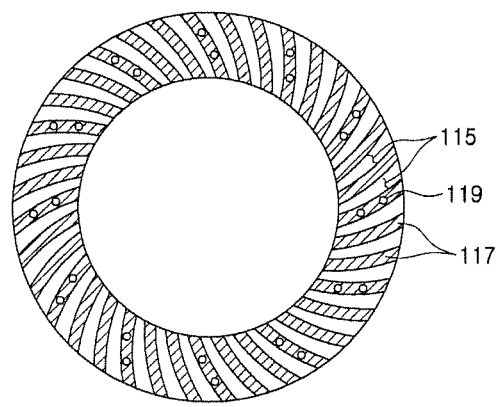

As illustrated in FIGS. 6A and 6B, the air vents 115 may be disposed radially inside the first disk body 110 and may have a bar-shaped space having a quadrangular cross section or a bar-shaped space having a predetermined curvature while having a quadrangular cross section.

As illustrated in FIG. 6A, the air vents 115 may have a bar-shaped space having a quadrangular cross section. In this case, the air vents 115 may have a linear-shaped air passage having a quadrangular cross section.

As illustrated in FIG. 6B, the air vents 115 may have a bar-shaped space having a quadrangular cross section while having a predetermined curvature. In this case, the air vents 115 may have a curved air passage curved by a predetermined curvature while having a quadrangular cross section.

The first disk member 100 and the second disk members 200 according to an exemplary embodiment may be formed of high manganese steel composed of 1.09 to 1.31 weight % of carbon (C), 16 to 20 weight % of manganese (Mn), andiron (Fe) and inevitable impurities as a remainder thereof.

Figure 11A:
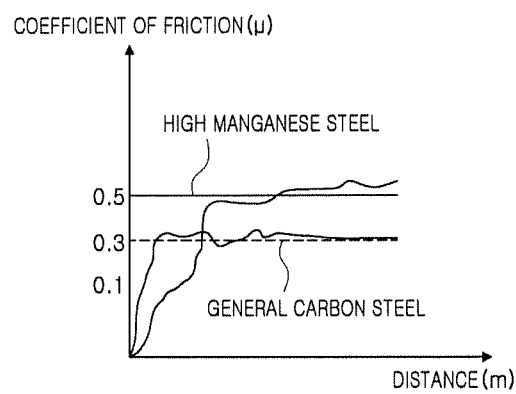
FIGS. 11A and 11B are graphs illustrating changes in coefficients of friction, based on coefficients of friction and distances between high manganese steel according to an exemplary embodiment in the present disclosure and general carbon steel, and changes in thermal conductivity according to temperatures therebetween.

FIG. 11A is a graph illustrating changes in coefficients of friction, based on coefficients of friction and distances, between high manganese steel composed of 1.09 to 1.31 weight % of carbon (C), 16 to 20 weight % of manganese (Mn), and iron (Fe) and inevitable impurities as a remainder thereof, according to an exemplary embodiment in the present disclosure, and general carbon steel.

Figure 11B:
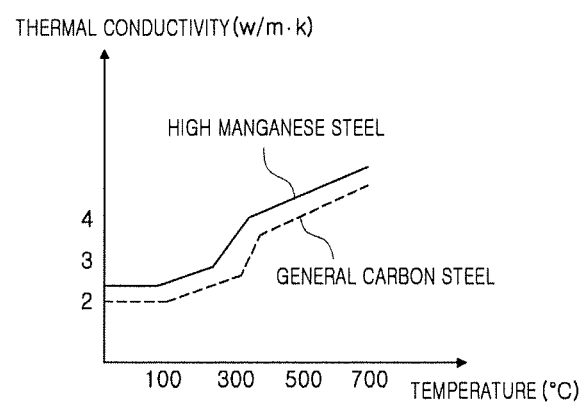

FIG. 11B is a graph illustrating changes in thermal conductivity according to temperatures between high manganese steel composed of 1.09 to 1.31 weight % of carbon (C), 16 to 20 weight % of manganese (Mn), and iron (Fe) and inevitable impurities as a remainder thereof according to an exemplary embodiment in the present disclosure, and general carbon steel.

The first disk member 100 and the second disk members 200 were manufactured using high manganese steel composed of 1.09 to 1.31 weight % of carbon (C), 16 to 20 weight % of manganese (Mn), and iron (Fe) and inevitable impurities as a remainder thereof, and general carbon steel, and braking performance, wear resistance, and heat dissipation characteristics thereof were compared to each other. It could be appreciated from the comparison results that in the case in which the first and second disk members 100 and 200 have been formed using the high manganese steel composed of 1.09 to 1.31 weight % of carbon (C), 16 to 20 weight % of manganese (Mn), and the remainder thereof, iron (Fe) and inevitable impurities, braking performance, wear resistance, and heat dissipation characteristics have been significantly improved, as compared to the case in which the first and second disk members 100 and 200 have been formed using general carbon steel.

In addition, the first disk member 100 and the second disk members 200 may be formed to include a basic composition containing 1.09 to 1.31 weight % of carbon (C), 16 to 20 weight % of manganese (Mn), and iron (Fe) and inevitable impurities as a remainder thereof and to include one or more selected from the group consisting of 2.2 to 2.8 weight % of chromium (Cr) and 0.3 to 0.7 weight % of copper (Cu) in addition to the basic composition.

Further, the first disk member 100 and the second disk members 200 may be formed of high-manganese steel composed of 1.09 to 1.31 weight % of carbon (C), 16 to 20 weight % of manganese (Mn), 2.2 to 2.8 weight % of chromium (Cr), 0.3 to 0.7 weight % of copper (Cu), and iron (Fe) and inevitable impurities as a remainder thereof.

When the first disk member 100 and the second disk members 200 were manufactured in the composition ratio as described above, it could be seen that braking performance of the brake was improved by 15% or more.

The results of the performance test are described in detail in the High Manganese Steel Brake Disk Test Report (Korea Automotive Technology Institute, Test Report No.: KTS 153152-2).

Performance test results of brake disk sample 1 (CASE 1) and brake disk sample 2 (CASE 2) will be compared with reference to the following high manganese steel brake disk test report (Korea Automotive Technology Institute, Test Report Number: KTS 153152-2).

Sample 1 (CASE 1): Grandeur TG brake disk (TG OEM Disk) formed of general carbon steel Sample 2 (CASE 2): High manganese steel disk in which the first disk member 100 and the second disk members 200 are formed of 1.09 to 1.31 weight % of C, 16 to 20 weight % of Mn, 2.2 to 2.8 weight % of Cr, 0.3 to 0.7 weight % of Cu, and Fe and inevitable impurities as a remainder thereof.

Figure 12A:
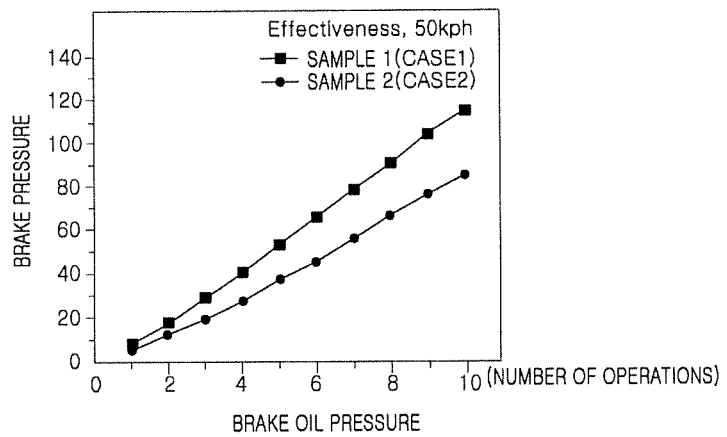
FIGS. 12A and 12B are drawings illustrating evaluation results of a performance test of a brake disk of Sample 1 (CASE 1) by the Korea Automotive Technology Institute and Sample 2 (CASE 2) according to an exemplary embodiment in the present disclosure.
Figure 12B:
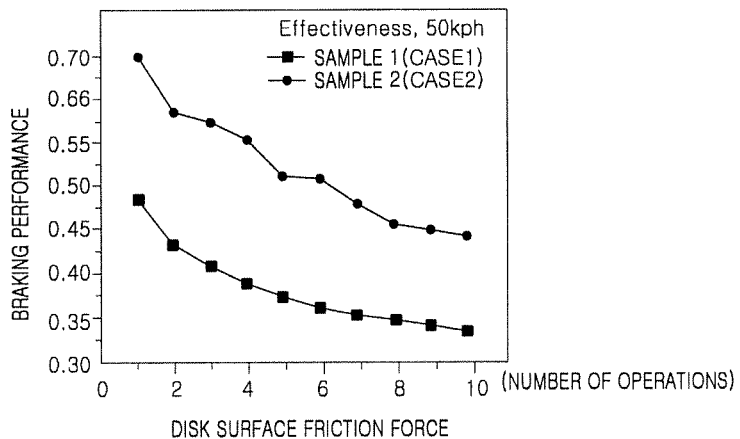

FIGS. 12A and 12B are drawings illustrating evaluation results of a performance test (Certification No. KTS 153152-2) of a brake disk of Sample 1 (CASE 1) by the Korea Automotive Technology Institute and Sample 2 (CASE 2) according to an exemplary embodiment in the present disclosure.

Referring to FIG. 12A, it can be seen that brake oil pressure of Sample 2 (CASE 2) is lower than that of Sample 1 (CASE 1) by about 10% to about 15%.

For example, relatively low brake oil pressure in Sample 2 may indicate that pressure of brake of Sample 2 (CASE 2) to be exerted for the same degree of braking when a vehicle is braked by stepping on the brake is less than that of Sample 1 (CASE 1).

Thus, in the case of Sample 2 (CASE 2), it can be appreciated that braking performance of the brake disk is improved because braking force may be sufficient even when stepping on the brake with relatively low force, as compared with that of Sample 1 (CASE 1).

Referring to FIG. 12B, it can be seen that surface friction force of the disk in Sample 2 (CASE 2) is about 1.5 to 2 times the surface friction force of the disk in Sample 1 (CASE 1).

For example, it can be appreciated that disk surface frictional force in Sample 2 (CASE 2) is significantly improved and the braking performance of the brake is significantly improved, as compared to Sample 1 (CASE 1).

Referring to the results of FIGS. 12A and 12B and the test report of the high manganese steel brake disk (Korea Automotive Technology Institute, Test Report No. KTS 153152-2), it can be seen that as a result of comparing the braking performance of the brake disks of Sample 2 (CASE 2) and Sample 1 (CASE 1), Sample 2 has braking performance of the brake having been improved by 15% or more, as compared with Sample 1 (CASE 1).

As set forth above, according to an exemplary embodiment in the present disclosure, a braking surface of a brake disk and a structural portion of the brake disk may be formed of different materials, thereby providing an attachable high-manganese steel brake disk having improved wear resistance and impact resistance as well as improved braking performance and wear resistance.

According to an exemplary embodiment in the present disclosure, as second disk members are configured detachably to two surfaces of a first disk member, for example, when braking surfaces of the second disk members formed of a high-manganese steel material contact a brake pad to be worn, only the second disk members having the braking surfaces contacting the brake pad may be replaced, and thus, the brake disk may be reused, thereby reducing replacement and maintenance costs of a brake disk.

According to an exemplary embodiment, by adopting an overlapping interlocking method in which the first disk member and the second disk members are fastened together, the torque in a direction of rotation of the brake disk, which is difficult to be supported only by fastening of the fastening member such as a bolt member may be stably supported. Thus, the first disk member and the second disk members may be stably fastened to each other.

While example embodiments have been shown and described above, it will be apparent to those skilled in the art that modifications and variations could be made without departing from the scope of the present disclosure as defined by the appended claims.

What is claimed is:

1. An attachable high-manganese steel brake disk comprising:
    a first disk member including air vents disposed radially therein to be spaced apart from each other; and
    a pair of second disk members installed to be attached to two surfaces of the first disk member and having a braking surface in contact with a brake pad,
    wherein between the first disk member and the second disk members, at least the second disk members are provided as high manganese steel members,
    wherein the first disk member and the second disk members are provided as members formed of high manganese steel composed of 1.09 weight % to 1.31 weight % of carbon (C), 16 weight % to 20 weight % of manganese (Mn), 2.2 weight % to 2.8 weight % of chromium (Cr), 0.3 weight % to 0.7 weight % of copper (Cu), and iron (Fe) and inevitable impurities as a remainder thereof.

2. The attachable high-manganese steel brake disk of claim 1, wherein the first disk member is provided as a member formed of a carbonated steel material, and
    the second disk members are provided as members formed of a high manganese steel material.

3. The attachable high-manganese steel brake disk of claim 1, wherein the first disk member comprises a first disk body, air vents spaced apart from each other within the first disk body, first protrusions respectively protruding from two surfaces of the first disk body and spaced apart from each other on the first disk body circumferentially, and first insertion portions disposed between the first protrusions, and
    the second disk members comprises a second disk body having a braking surface contacting a brake pad, second protrusions protruding from a surface of the second disk body and spaced apart from each other circumferentially on the second disk body, and second insertion portions disposed between the second protrusions.

4. The attachable high-manganese steel brake disk of claim 3, wherein the first disk member and the second disk members are fixed by a fastening member, in a state in which the first protrusions are inserted into the second insertion portions and the second protrusions are inserted into the first insertion portions.

5. The attachable high-manganese steel brake disk of claim 4, wherein the fastening member is disposed in positions in which the first insertion portions and the second protrusions are coupled to each other, and is provided as bolt members fastened in a state in which lower surfaces of the first insertion portions and the second protrusions contact each other.

6. The attachable high-manganese steel brake disk of claim 3, wherein a circumferential width of each of the second protrusions is greater than a circumferential width of each of the first protrusions.

7. The attachable high-manganese steel brake disk of claim 3, wherein a circumferential width of each of the first protrusions is greater than a circumferential width of each of the second protrusions.

8. The attachable high-manganese steel brake disk of claim 3, wherein the first protrusions are disposed to correspond to positions of portions of the air vents.

9. The attachable high-manganese steel brake disk of claim 1, wherein the air vents are disposed inside the first disk body, and have a bar-shaped space having a quadrangular cross section or a bar-shaped space having a predetermined curvature while having a quadrangular cross section.

10. An attachable high-manganese steel brake disk comprising:
- a first disk member including air vents disposed radially therein to be spaced apart from each other; and
- a pair of second disk members installed to be attached to two surfaces of the first disk member and having a braking surface in contact with a brake pad,
- wherein between the first disk member and the second disk members, at least the second disk members are provided as high manganese steel members,
- wherein the first disk member and the second disk members are provided as members formed of high manganese steel including a basic composition containing 1.09 weight % to 1.31 weight % of carbon (C), 16 weight % to 20 weight % of manganese (Mn), and iron (Fe) and inevitable impurities as a remainder thereof and including one or more selected from the group consisting of 2.2 weight % to 2.8 weight % of chromium (Cr) and 0.3 weight % to 0.7 weight % of copper (Cu).

* * * * *